United States Patent [19]
Foster, Sr. et al.

[11] 3,827,682
[45] Aug. 6, 1974

[54] APPARATUS FOR ROTATION OF PLATES TO FACILITATE WELDMENT

[75] Inventors: Christopher J. Foster, Sr., Sands Point; Christopher J. Foster, Jr., Port Washington, both of N.Y.

[73] Assignee: Christopher J. Foster, Inc., Port Washington, N.Y.

[22] Filed: Jan. 17, 1973

[21] Appl. No.: 324,445

[52] U.S. Cl............................ 269/8, 269/58, 269/61, 269/71, 214/1 Q
[51] Int. Cl............................................ B25b 11/00
[58] Field of Search............ 269/55, 56, 58, 59, 61, 269/8, 71; 214/1 Q; 198/33 AD

[56] References Cited
UNITED STATES PATENTS

| | | |
|---|---|---|
| 1,060,430 | 4/1913 | Crecelius.............................. 269/59 |
| 2,545,953 | 3/1951 | Hall.................................. 269/59 X |
| 3,491,995 | 1/1970 | Taraba................................... 269/8 |
| 3,700,228 | 10/1972 | Peale .................................. 269/61 |

*Primary Examiner*—Roy Lake
*Assistant Examiner*—Mark S. Bicks
*Attorney, Agent, or Firm*—Kane, Dalsimer, Kane, Sullivan and Kurucz

[57] ABSTRACT

An apparatus and method for facilitating the weldment of plates and stiffness which form a section of predetermined size with the least amount of handling. The apparatus includes a frame suitable to support the plates, holding devices to secure the plates to the frame, lifting mechanisms to lift the frame and plates for rotational purposes and a drive assembly to rotate the frame in an arc of 180° to facilitate the weldment of the plates together to form a plate section.

12 Claims, 6 Drawing Figures

APPARATUS FOR ROTATION OF PLATES TO FACILITATE WELDMENT

BACKGROUND OF THE INVENTION

Conventional practice for weldment of plates of steel, other metal, plastic or other similar material for the purpose of forming sections to the required sizes, generally dictates the use of a trunnion, assisted by a crane, to rotate the section for the purpose of completing the weldment of the seams on the back sides of the plates which constitute the plate section. As an example steel will be used as the material to be welded in describing the depicted embodiment.

Rotation of the plates in this manner is cumbersome and time-consuming while requiring the costly use of crane service and manpower. A prime disadvantage is that of having prohibitive downtime of the automated welding equipment on stand-by time awaiting the plate section to be rotated thereby creating production delays. It would be extremely advantageous in the art to provide a device which eliminates the initial cost of overhead crane runways and cranes and which can be located anywhere in a welding fabrication line without extensive material and installation costs. It could be extremely advantageous to be able to weld plates and accessories in the form of sections of virtually any size within a designed framework with an effective increase in the volume of production.

SUMMARY OF THE INVENTION

With the above background in mind, it is among the primary objectives of the present invention to provide an apparatus and method for weldment of plates which meets the above suggested criteria and eliminates overhead crane runways and cranes and minimizes material and installation costs.

The present method and means improves the technique of the handling of steel plates which constitute a predetermined section of a ship, waterworks, bridge structure, building, or similar structures on a turnover frame which is capable of receiving the plates on a flat or curved horizontal position for weldment into a predetermined section. The system contemplates lifting of frame and steel section after weldment is complete, in a vertical direction by hydraulic lifts or other similar means for rotation purposes. The rotation is accomplished through an arc of 180° with the section of plates being held to the frame by holding devices on the frame. This action permits and facilitates the weldment of seams on the opposite side of the section of plates. Thereafter, the frame and section of plates can be returned by rotation to the original horizontal position for removal of the section of plates from the apparatus to a roller assembly line for additional work.

More specifically, the procedural method commences with the arrangement of various steel plates which constitute a predetermined section on a conveyor assembly where the seams are aligned and tack welded together. With the completion of the tack welding, the steel section is moved along the conveyor assembly by rollers onto the rotation frame of the apparatus.

The steel section is then positioned and aligned and properly secured by holding devices to the rotation frame for the purpose of complete weldment of all seams on the exposed face of the steel section. The welding gantry, with automated welding equipment, moves into position and completes the weldment of the seams. Upon completion of the weldment of the seams, the frame and section is lifted vertically by a lifting mechanism to provide the necessary clearance for rotation of the frame and section. A drive gear assembly which rotates the frame is engaged and the frame and section are rotated through an arc of 180° and then are lowered to the original position on the roller table assembly of the apparatus. Holding devices which secure the plate section to the rotation frame are released and the rotation frame is lifted to a predetermined height to provide clearance for the welding gantry to move into position and complete the weldment of seams on the newly exposed face of the steel section. With the weldment of seams completed, the rotation frame is lowered and the holding devices are again activated to secure the steel section to the frame. Frame and steel section are then lifted vertically and rotated through an arc of 180° and thereafter are returned to the original position. The holding devices are released and the steel section is moved from the rotation frame to the connecting roller conveyor assembly line for additional work.

In general, the apparatus needed to carry out the above described method for rotating steel plate sections composed of various plates welded together for the purpose of providing a more efficient method to increase productivity includes the following interconnected elements. A rotating frame is connected to a lift system for lifting the frame in a vertical direction to provide for the necessary clearance for rotation of the frame. Means are provided to secure the steel section to the frame by holding devices. Means are also provided for utilizing a drive assembly to rotate the frame in an arc 180° and, furthermore, means are provided to control the braking of the frame during rotation.

The present apparatus is designed to minimize the steps required in the method for the fabrication of steel sections comprised of various plates which require the weldment of the seams, channels, beams or other metallic objects on both faces of the section as compared to conventional methods.

In conclusion, an apparatus and method are provided for facilitating the weldment of adjoining plates to form a plate section. The apparatus includes a supporting frame to hold the plates and means on the supporting frame to secure the plates thereto during weldment operations. Shifting means are provided to shift the frame holding the plates between an operative and an inoperative position. Finally, rotation means are provided to rotate the frame and plates between a first welding position and a second welding position when the frame is in the operative position to thereby facilitate access to the plates for substantially complete welding operations.

The general method steps include placing the plates on a supporting frame structure in an inoperative position and securing the plates on the supporting frame structure. Thereafter, the plates are partially welded together and the frame is then shifted to an operative position where the frame is rotated to a second welding position. Thereafter, the welding of the plates is completed and the frame is shifted to the inoperative position from which the plates are removed from the frame.

With the above discussed objectives, among others, in mind, reference is had to the attached drawings.

DESCRIPTION OF THE PREFERRED EMBODIMENTS

Figure 1:
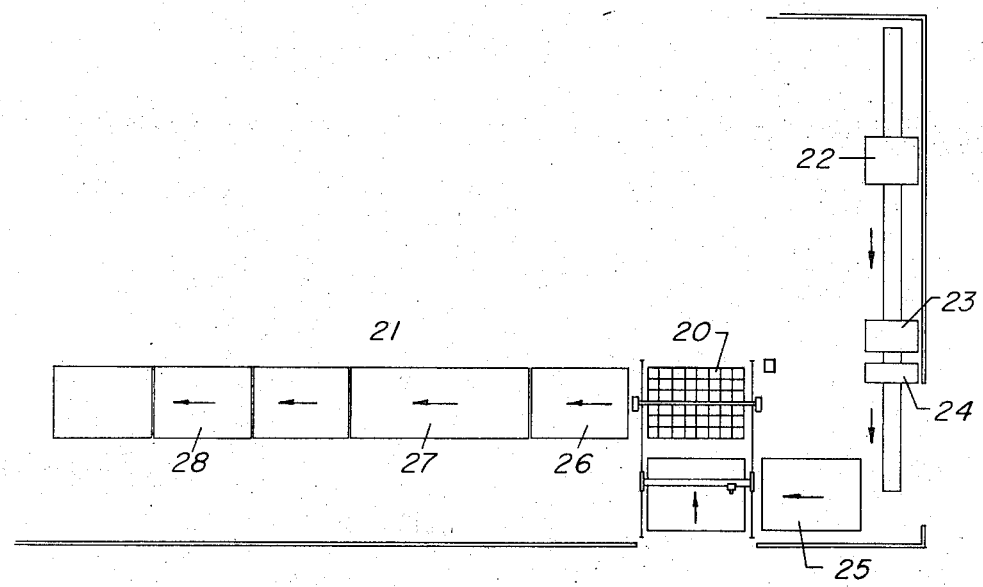
FIG. 1 is a block diagram of an in-line weldment production conveyor line with the apparatus of the invention located therein.

As an operative example of the apparatus and method of the present invention, the depicted embodiment is shown in operation for welding plates such as steel plates together in shipbuilding operations. For instance, FIG. 1 shows an environmental view of apparatus 20 installed in a conveyor line 21 of that type. In operation, the plates would come from a blast cabinet 22 into a spray booth 23 and then into a oven 24.

Upon exit from the oven, the plates are placed in the welding line on the portion of the conveyor 25 where the plates are aligned and tack welded. The plates then progress to weldment apparatus 20 where the welding of both sides of the plates is accomplished. The plates are then removed from apparatus 20 onto a continuation portion 26 of the conveyor system where reeve preparation is accomplished along with weld inspection. Thereafter the welded section is conveyed to the reeving portion 27 of the conveyor and on down the line in a conventional fashion to a second directional welding portion 28. From then on, the welded section can be handled in any conventional manner (not shown).

Figure 2:
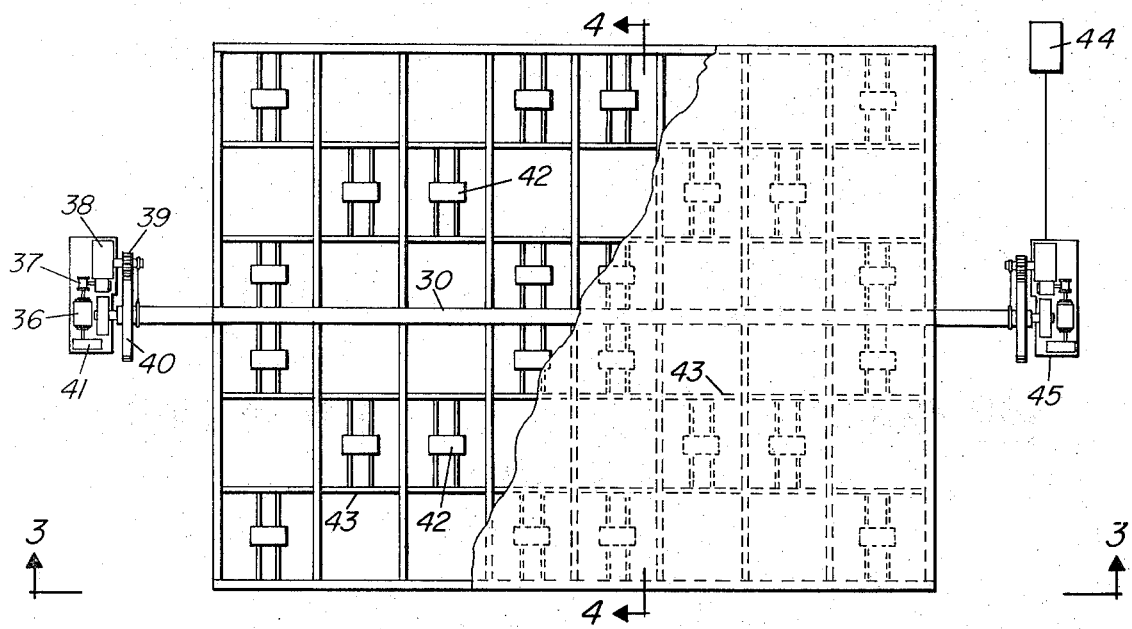
FIG. 2 is a top plan view of the apparatus of the invention.
Figure 3:
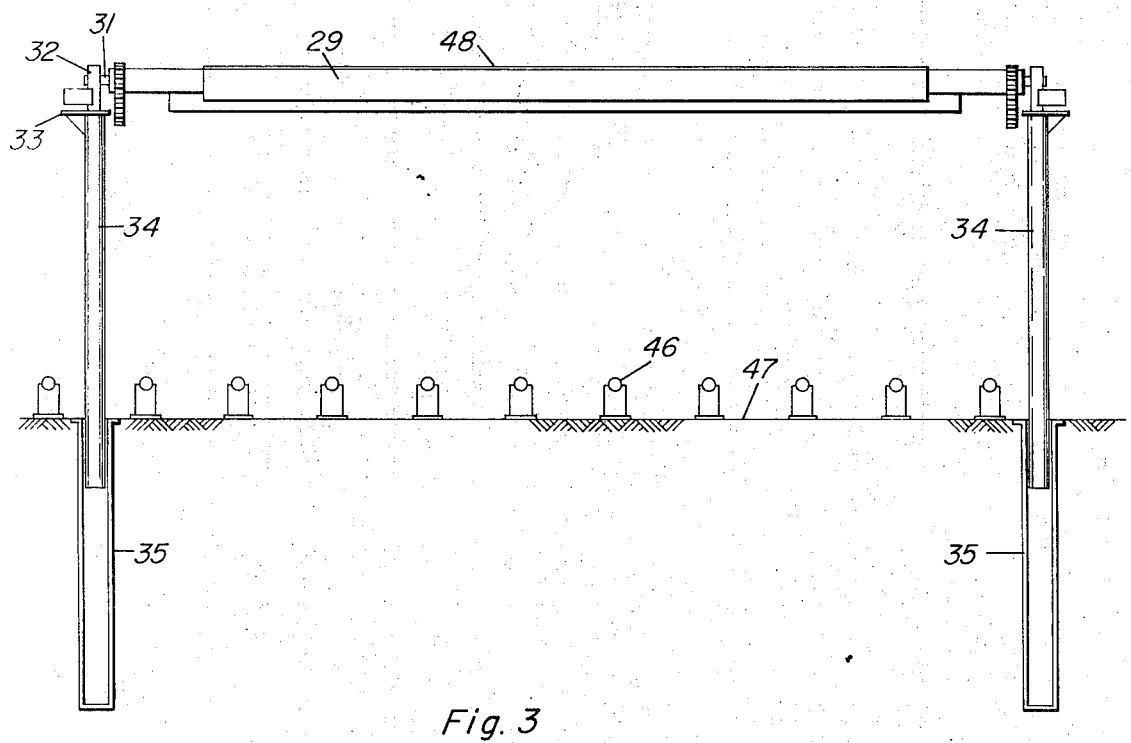
FIG. 3 is a sectional elevation view thereof taken along the plane of line 3—3 of FIG. 2.

Apparatus 20 is shown in detail in FIGS. 2 and 3 of the drawings. A frame 29 is provided with a built-in central girder 30 which is designed to incorporate a steel shaft 31 at both ends of the girder. Shaft 31 is installed into a pillar box housing 32 located on platform 33. Hydraulic arm 34 located within a hydraulic lifting device 35 supports platform 33.

The force utilized for rotation of frame 29 is obtained from electric motor 36 coupled to a small gear box 37. Coupled to gear box 37 is a larger gear box assembly 38 which drives pinion gear 39 thereby delivering the necessary torque to gear 40. Shaft 31 has gear 40 mounted thereon so that rotation of gear 40 rotates shaft 31 and, consequently, interconnected frame 29. Brake 41 provides for control of the rotation of the frame to its interconnection with motor 36. A plurality of electric magnets 42 are affixed to the cross members 43 of frame 29 in any desired arrangement and are exposed to the upper surface of the frame for engagement with plates to be welded. A separate control panel 44 interconnected with the frame assembly provides means for operating the electric magnets 42 and for rotating the frame. Additionally, controls for the hydraulic lift mechanism can also be incorporated in the central control panel 44 and connected in a conventional fashion to the hydraulic system 35 including the arm 34. It can be noted from the drawings that a separate drive assembly 45 for rotational purposes can be located on each side of frame 29 with identical elements in each assembly. Similarly, a separate hydraulic lift assembly 35 can be located on each side of frame 29 to support and lift the frame and drive assembly in the same manner as the hydraulic assembly 35 on the opposite side of the frame.

To facilitate placement and removal of the cumbersome, heavy steel panels with respect to frame 29, a plurality of rollers 46 are mounted on the bed 47 for the frame and extend upwardly therefrom so that when the frame is in the lower position, rollers 46 will extend upward through the openings between the cross bars of the frame. In this manner, rollers 46 form a bearing surface for sliding the plates on and off the frame 29 from an adjacent conveyor system. It should be kept in mind that frame 29 is a grid-like structure with the cross members 43 having the electric magnets 42 mounted at certain of the formed interstices. In general, frame 29 is open at the top and the bottom with the exception of the cross members 43 and electric magnets 42.

FIG. 3 shows apparatus 20 in the raised position with the steel plates 48 mounted thereon. In actual operation, as shown in general in FIG. 1, the steel plates are passed through the conveyor system 21 until they engage with rollers 46 and are positioned on frame 29. Control panel 44 is then activated to operate the electric magnets 42 in a conventional manner and secure the steel plates under the force of magnetism to frame 29. The control panel then is activated to conventionally cause hydraulic assembly 35 to lift frame 29 along with the secure plates to the uppermost position as shown in FIG. 3. The force is applied on both sides of the frame through hydraulic arms 34 in engagement with platforms 33.

Figure 4:
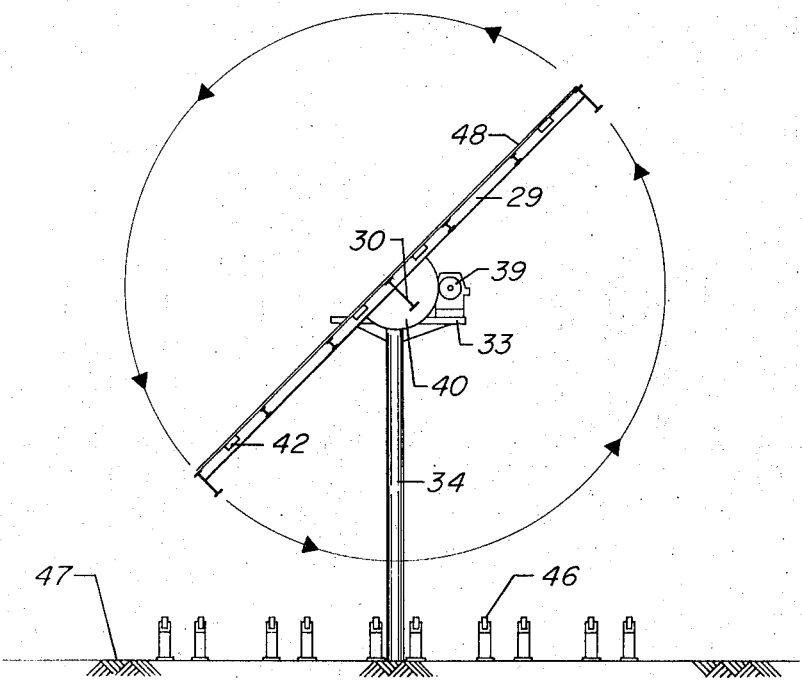
FIG. 4 is a sectional end view thereof taken along the plane of line 4—4 of FIG. 2 with arrows showing the direction of rotation of the frame portion thereof.
Figure 5:
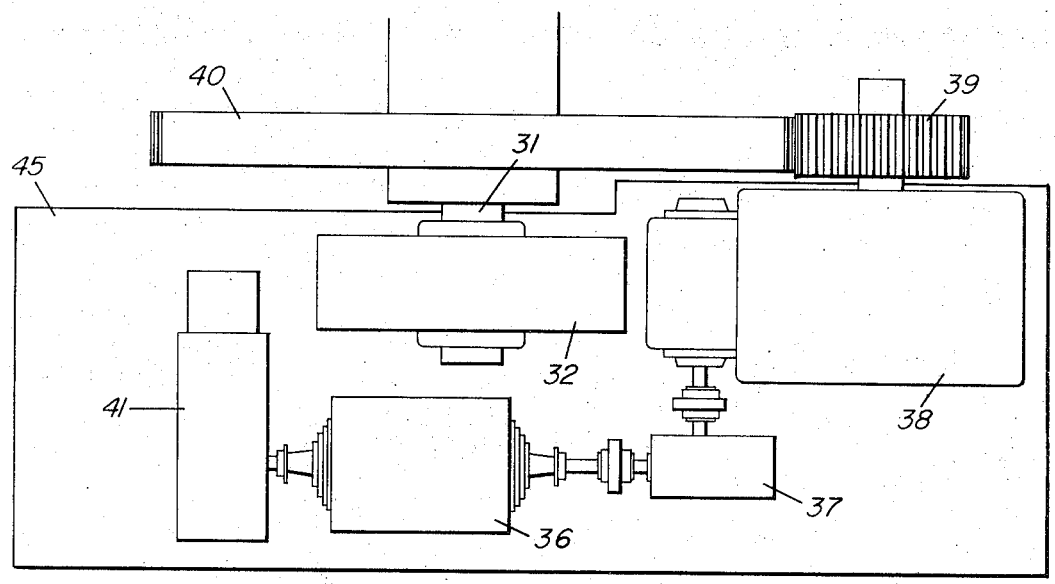
FIG. 5 is an enlarged fragmentary top plan view of the rotating mechanism portion of the apparatus of the invention.
Figure 6:
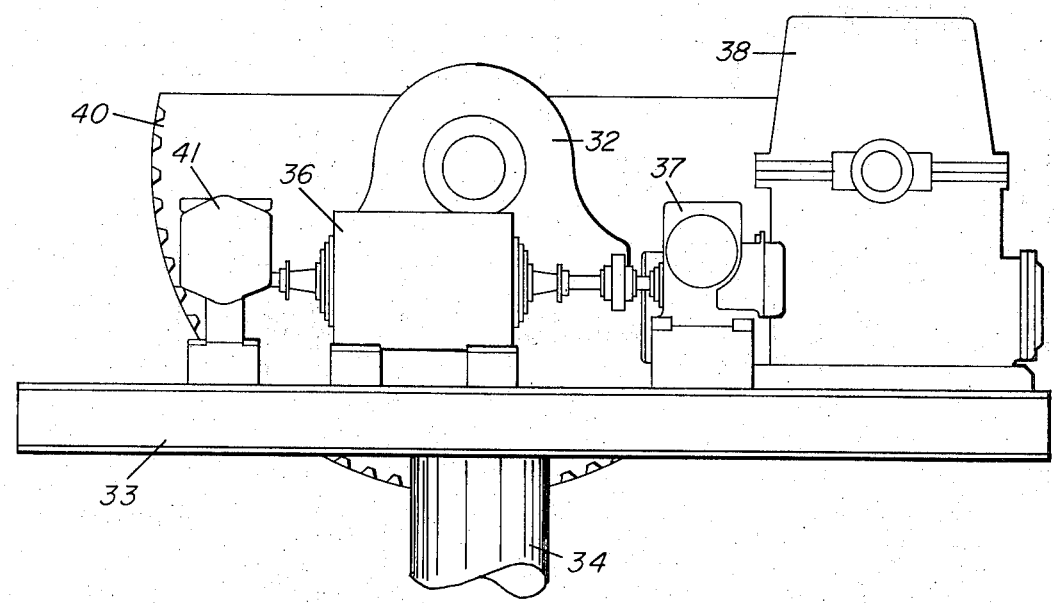
FIG. 6 is a sectional elevation view of FIG. 5.

It should be kept in mind that while the frame is in the lower position and has the plates secured to the surface thereof, welding of the seams of one side of the plates 48 is accomplished. The object is to complete welding of the opposite side of the plates. Therefore, when apparatus 20 has frame 29 with the partially welded plates 48 thereon in the upper position, control panel 44 is activated to operate motor 36. The shaft of motor 36 is connected to gear boxes 37 and 38 and to pinion gear 39 so that pinion gear 39 is rotated as the motor shaft is rotated. Pinion gear 39 is engaged with rotational gear 40 on shaft 31 so that as pinion gear 39 is rotated gear 40, shaft 31 and the interconnected frame assembly 29 with the plates secured thereon by magnetism are also rotated. As shown in FIG. 4, the rotation is accomplished through 180 degrees so that the undersurface of the partially welded plates 48 are then exposed for welding. Welding can take place at that time to complete the weldment of plates 48 into a plate section. Thereafter, control panel 44 can be operated to lower the hydraulic apparatus 35 and bring the frame downward to base 47. The electric magnets 42 are released and welded plates 48 are then removed from frame 29 with the assistance of rollers 46 for any desired purpose such as further treatment as shown in FIG. 1. Details of the rotational drive assembly 45 are shown in FIGS. 5 and 6.

An alternative operational method for the welding procedure which can be used similarly with the apparatus described in detail above includes bringing the plates to be welded on conveyor system 21 to station 25 where the seams are aligned and tack welded together. Upon completion of the tack welding, the plates are moved along the conveyor assembly with the assistance of rollers 46 onto frame 29.

The plates are then positioned and aligned and properly secured by means of magnets 42 to frame 29 for the purpose of complete weldment of all seams on the exposed face of the plates. A welding gantry (not shown), with automated welding equipment, moves into position and completes the weldment of the seams. Thereupon, the frame and partially welded plates are lifted vertically by hydraulic lift assembly 35 to provide the necessary clearance to rotate the frame and plates.

Drive gear assembly 45 which rotates the frame 29 is engaged and frame 29 and partially welded plates 48 are rotated through an arc of 180° and then are lowered to the original position on roller table or base 47 of apparatus 20. The holding devices or magnets 42 which secure the plates 48 to frame 29 are released and frame 29 is lifted to a predetermined height to provide clearance for the welding gantry to move into position and complete the weldment of the seams on the newly exposed face of the plates. With the weldment of seams completed, the rotation frame 29 is lowered and magnets 42 are activated which secure the welded plate section 46 to the frame 29. Frame and welded section 48 are then lifted vertically and rotated through an arc of 180 degrees and returned to the initial position. The frame is then once again lowered by hydraulic means 35 and magnets 42 are released so that the welded section 48 can be moved from the rotation frame with the assistance of rollers 47 to the next receiving station 26 of conveyor system 21 for additional work.

It is contemplated that the present apparatus can incorporate other types of holding devices in place of magnets 42 such as clamps. Similarly, other conventional lifting means can be utilized in place of the hydraulic lifting device depicted and described above. It is also contemplated although not shown that both rotational apparatus 45 can be located on one side of frame 29 rather than on opposite sides of the frame and also a single rotational assembly 45 has been found to operate satisfactorily. Finally, motor 36 may either be an electric motor or a hydraulic motor to supply the power for rotation of frame 29. The present apparatus and method have been found effective for handling extremely large sized steel plates utilized in shipbuilding. For example, plates having dimensions of thirty-eight by fifty-five feet and weighing approximately eighty tons can be effectively welded.

Thus, the above discussed objectives of the present invention, among others, are effectively attained.

We claim:

1. Apparatus for facilitating the weldment of adjoining plates to form a plate section comprising:
   a supporting frame to hold the plates;
   means on the supporting frame to secure the plates thereto during rotation operations;
   shifting means to shift the frame holding the plates between an operative position and an inoperative position;
   rotation means to rotate the frame and plates between a first welding position and a second welding position when the frame is in the operative position to thereby facilitate access to the plates for substantially complete welding operations;
   the rotation means including a braking device to facilitate controlled rotation of the frame and secured plates between a substantially horizontal normal first welding position and a second welding position substantially 180° from the first welding position thereby facilitating access to both sides of the adjoining plates; and
   means on the apparatus for introduction thereof intermediate an in-line production conveying system for weldment and handling of plates in shipbuilding procedures, the means including a conveyor portion positioned with respect to the frame and extending upwardly therefrom so as to engage with the plates and facilitate positioning and removal of the plates with respect to the frame during material handling activities.

2. The invention in accordance with claim 1 wherein the plates are of a steel material.

3. The invention in accordance with claim 1 wherein the shifting means includes elevation means to elevate the frame and secured plate to a predetermined height for rotational purposes and to return the frame and secured plate to the initial position subsequent to rotation.

4. The invention in accordance with claim 1 wherein the rotation means includes speed control means to regulate the speed of rotation of the frame and secured plates.

5. The invention in accordance with claim 1 wherein the rotation means is positioned adjacent both sides of the frame.

6. The invention in accordance with claim 1 wherein the securing means includes electrically controlled magnets installed in the frame structure and exposed to the surface of the frame structure for engagement with the plates positioned thereon.

7. The invention in accordance with claim 1 wherein the shifting means includes a hydraulic lifting device connected to said frame.

8. The invention in accordance with claim 7 wherein the hydraulic lifting device includes two separate mechanisms with each mechanism being centrally located on opposing sides of the frame and being mounted in independent foundations.

9. The invention in accordance with claim 1 wherein the rotation means includes a gear drive assembly connected to the frame.

10. The invention in accordance with claim 9 wherein there are two gear drive assemblies with each assembly being centrally located adjacent an opposing side of the frame and being mounted on an independent platform.

11. The invention in accordance with claim 10 wherein the platform supporting each gear drive assembly is located on top of a hydraulic lifting mechanism forming part of the shifting means.

12. The invention in accordance with claim 1 wherein the shifting means includes a hydraulic lifting mechanism having a platform mounted at the top thereof and the braking device located on the platform.

* * * * *

UNITED STATES PATENT OFFICE
CERTIFICATE OF CORRECTION

Patent No. 3,827,682                    Dated  August 6, 1974

Inventor(s) Christopher J. Foster et al

It is certified that error appears in the above-identified patent and that said Letters Patent are hereby corrected as shown below:

In the Abstract, line 2, "stiffness" should be

--stiffners--.

Signed and sealed this 17th day of December 1974.

(SEAL)
Attest:

McCOY M. GIBSON JR.                C. MARSHALL DANN
Attesting Officer                  Commissioner of Patents